United States Patent [19]
Stephens

[11] Patent Number: 6,114,280
[45] Date of Patent: Sep. 5, 2000

[54] HIGHLY ACTIVATED CARBON FROM CAUSTIC DIGESTION OF RICE HULL ASH AND METHOD

[75] Inventor: Douglas K. Stephens, Dickinson, Tex.

[73] Assignee: Agritec, Inc., Houston, Tex.

[21] Appl. No.: 09/159,809

[22] Filed: Sep. 23, 1998

Related U.S. Application Data

[60] Continuation-in-part of application No. 08/977,524, Nov. 24, 1997, Pat. No. 5,858,911, which is a division of application No. 08/677,875, Jul. 10, 1996, Pat. No. 5,714,000, which is a continuation-in-part of application No. 08/642,925, May 6, 1996, abandoned.

[51] Int. Cl.⁷ ............................. C01B 31/08; C01B 31/12
[52] U.S. Cl. ...................... 502/437; 502/416; 502/427; 502/180; 423/445 R; 423/449.8
[58] Field of Search ..................... 502/180, 416, 502/427, 437; 423/445 R, 449.8, 461

[56] References Cited

U.S. PATENT DOCUMENTS

| | | | |
|---|---|---|---|
| 4,425,256 | 1/1984 | Pilipski | 502/180 |
| 5,064,805 | 11/1991 | Otowa | 502/180 |
| 5,187,141 | 2/1993 | Jha et al. | 502/432 |
| 5,242,879 | 9/1993 | Abe et al. | 502/180 |
| 5,726,118 | 3/1998 | Ivey et al. | 502/180 |
| 5,858,911 | 1/1999 | Wellen et al. | 502/180 |
| 5,883,040 | 3/1999 | Armstrong et al. | 502/437 |

*Primary Examiner*—Michael Marcheschi
*Attorney, Agent, or Firm*—James F. Weiler

[57] ABSTRACT

Disclosed are highly activated carbon particles derived from caustic digestion of rice hull ash obtained from thermal pyrolysis of rice hulls having an iodine number of at least 650 to 1000. The activated carbon pores are free of silicate residue from the caustic digestion. Also disclosed are methods of removing the silicate residue from the caustic silicate solution during digestion effective to substantially improve the activation of the carbon particles to commercial grade.

10 Claims, No Drawings

HIGHLY ACTIVATED CARBON FROM CAUSTIC DIGESTION OF RICE HULL ASH AND METHOD

CROSS-REFERENCE TO RELATED APPLICATION

This application is a continuation-in-part application of U.S. application Ser. No. 08/977,524, filed Nov. 24, 1997, which is a divisional application of U.S. application Ser. No. 08/677,875, filed Jul. 10, 1996, now U.S. Pat. No. 5,714,000, which is a continuation-in-part application of U.S. application Ser. No. 08/642,925, filed May 6, 1996, abandoned.

FIELD OF THE INVENTION

The present invention relates to highly activated carbon and its production from rice hull ash.

BACKGROUND OF THE INVENTION

Activated carbons are adsorbents derived from carbonaceous raw materials in which thermal or chemical methods are used to remove most of the volatile non-carbon constituents and a portion of the original carbon content. This yields a structure with high porosity and surface area typically in the range of 600 to 1200 square meters per gram ($m^2/g$). The surface area is usually measured by the BET (Brunauer, Emmett, Teller) adsorption of nitrogen ($N_2$) on the surface which correlates closely with the absolute values obtained in an iodine number test (ASTM D4607, "Standard Test Method of Iodine Number of Activated Carbon").

Activated carbons can be produced from various raw materials, each of which will provide some differences in physical and adsorptive properties of the finished product. The most widely used materials in the commercial manufacture of activated carbons are: wood, coconut shells, peat, lignite, bituminous and anthracite coals, petroleum cokes, and synthetic polymers. Reactivation or regeneration of commercial activated carbons are normally required when they are considered to be "spent" and have reached their maximum adsorption. This is accomplished by thermal or chemical means depending on the type of adsorbate in the carbon. Some attempts have been made to produce activated carbons of commercial grade from agricultural wastes, including rice straw, sugarcane bagasse, and the hulls of soybeans, cottonseed, rice and peanuts; but to the applicants' knowledge, these attempts were unsuccessful and commercial grade highly activated carbon has never been produced from them or from rice hulls or rice hull ash prior to the present invention.

As described in U.S. Pat. No. 5,714,000, activated carbon is generated in quantities ranging from 3 percent to as much as 40 percent by weight in rice hull ash depending on the type of combustion or gasification process (thermal pyrolysis) utilized to burn rice hulls.

During the caustic digestion of rice hull ash to produce a caustic silicate solution, the amorphous silica reacts with the alkaline element and becomes a soluble compound in the silicate solution. The activated carbon remains an inert material and becomes a suspended solid in the silicate solution. Some of the carbon pores become restricted by the silicate solution which must be removed to return the carbon to a highly activated state. Since the carbon is not dissolved in the silicate solution, it can be removed by conventional liquid/solids filtration or separation equipment as described in U.S. Pat. No. 5,714,000.

Activated carbons are defined as highly porous, carbonaceous materials. The porosity provides a large surface area which results in exceptional adsorptive properties. In any activated carbon particle, pores of different sizes are found. The pores can be distinguished into:

(1) Micropores=radius below 1 nanometer (nm);
(2) Mesopores=radius 1 to 25 nanometers (nm);
(3) Macropores=radius larger than 25 nanometers (nm).

The micropores and mesopores give the carbon its adsorptive capacity. They are formed during the process of activation.

The sizes of pores in activated carbons can be measured by iodine number, methylene blue number, or molasses number. The iodine number as determined by ASTM D4607, "Standard Test Method for Determination of Iodine Number of Activated Carbon," correlates well with the surface area available for adsorption of small molecules in the 1 to 25 nm range. For highly adsorbent activated carbons, the iodine number is in the range of 650 to 1000.

Commercially available rice hull ash currently is produced by gasification or by combustion or burning rice hulls in a furnace. Thermal pyrolysis is a chemical change that occurs in a substance through the application of heat. Combustion is the act or process of burning or a chemical change, especially oxidation, accompanied by the production of heat and light. In both, primarily amorphous rice hull ash having activated carbon diffused throughout is produced. Advantageously, during the thermal pyrolysis of rice hulls and caustic digestion of the resulting rice hull ash, the activated carbon particles are reduced to sizes that are consistently smaller than commercially available granular activated carbon (GAC) and powdered activated carbon (PAC) and which do not disrupt the normal cellular structure of the foamed product as disclosed in U.S. Pat. No. 5,714,000.

For convenience, the term "thermal pyrolysis" includes combustion, gasification, and any and all forms of heat which produces rice hull ash and activated carbon from rice hulls.

Any process in which thermal pyrolysis is used to produce rice hull ash and activated carbon from the rice hulls may be used in the present invention.

In the current burning or combustion process, raw rice hulls are continuously added to the top of the furnace, and the ash is continuously removed from the bottom. Temperatures in the furnace generally range from 800° F. to about 1400° F., and the residence time for the ash in the furnace is about three minutes. Upon leaving the furnace, the ash is rapidly cooled to provide ease in handling. When treated by this method, silica remains in a relatively pure amorphous state rather than in the crystalline forms known as quartz, tridymite, or crystobalite. Transition from the amorphous to the crystalline state generally takes place when the silica is held at very high temperatures, for example 2000° F. for longer periods of time. The significance of having the silica in an amorphous state is that the silica maintains a porous skeletal structure rather than migrating to form crystals, and the amorphous form of silica does not cause silicosis thus reducing cautionary handling procedures. The burning or combustion of the rice hulls is time-temperature related, and burning of these hulls under these conditions produces rice hull ash having carbon particles from the burning of the hulls which activates the carbon. Conventional combustion of rice hulls produces from about 3 percent to about 13 percent by weight of activated carbon. The amount of activated carbon present in the rice hull ash is dependent on the amount of combustion. If the amount of activated carbon in the rice hull ash used in the foaming process and in the foamed composition cannot be used advantageously in making floral, agricultural, nursery, and horticultural foams, such excess activated carbon can be separated from the caustic digested rice hull ash silicate solution and is a very valuable and exceedingly pure activated carbon product. While amorphous rice hull ash is preferred, some crystalline rice hull ash can be present.

In the current gasification of rice hull ash, conventional coal gasification equipment is used. Rice hulls are heated in a furnace at temperatures of about 800° F., the gas is collected and then burned to produce energy, and rice hull ash including activated carbon is recovered. The amount of activated carbon ranges up to 40 percent by weight or more. Any or all excess activated carbon can be removed by conventional filtration processes and equipment and is a valuable commodity.

Generally, in the commercial burning of rice hulls as an energy source, the resulting ash includes about ½ percent of metals, such as magnesium, potassium, iron, aluminum, calcium, titanium, and manganese.

The production of a caustic silicate solution from amorphous rice hull ash is a caustic digestion process. Rice hull ash is heated with a caustic solution, such as sodium hydroxide (NaOH), which reacts with the solid silica ($SiO_2$) to create the sodium silicate solution. The principal chemical reaction is characterized as follows:

$$2NaOH + nSiO_2 + H_2O \rightarrow Na_2O:n(SiO_2) + H_2O$$

where "n" represents the silica/alkali weight ratio.

For the current industry standard solution, the chemical equation becomes:

$$2NaOH + 3.22\ SiO_2 + H_2O \rightarrow Na_2O:3.22(SiO_2) + H_2O.$$

In addition to sodium hydroxide, sodium carbonate/calcium oxide reaction products, sodium hydroxide by-product liquors, and low grade soda ash/lime sources, as well as others, can be used in the caustic digestion process.

Present commercial grades of liquid sodium silicates not derived from rice hull ash range in silica/alkali weight ratio from about 1.6 to about 3.8. Such ratios are satisfactory for rice hull ash derived liquid sodium silicate in the present invention.

As previously mentioned, during the thermal pyrolysis of rice hulls and the caustic digestion of the amorphous rice hull ash to produce a sodium silicate solution, the activated carbon particles are reduced to sizes that are consistently smaller than commercially available granular activated carbon (GAC) and powdered activated carbon (PAC). Common crushed granular activated carbon sizes are 12×40 and 8×30 U.S. standard mesh, which range in diameter from 1,680 to 425 microns and 2,380 to 590 microns, respectively. Commercially available PACs typically have particle sizes of 65 to 90 percent passing a U.S. Standard 325 mesh (45 microns) sieve. The activated carbon in the unrefined sodium silicate solution derived from the caustic digestion of rice hull ash has particle sizes of 100 percent passing a U.S. Standard 500 (25 microns) sieve, with the average size of about 12 microns diameter.

The particle sizes of the suspended solids, such as activated carbon, in the caustic silicate solution raw material are critical because larger particles have decreased absorption/adsorption and retention of liquids. The particle size distribution is also important because the smaller carbon particles absorb more rapidly than larger particles.

During the caustic digestion of the rice hull ash, which has the activated carbon diffused throughout, some of the pores become restricted by silicate residue from the caustic silicate solution. Consequently, activated carbon filtered from the silicate solution without any further treatment yields lower iodine numbers in the range of 225 to 300 because of the restricted pores. Since rice hulls contain various concentrations of biogenic silica, the rice hull ash can have from about 55 to 97 percent silica depending on the type of combustion used to burn the hulls. Even though this biogenic silica is amorphous, the structure and geometry result in a relative low surface area of less than 20 square meters per gram ($m^2/g$). These features make rice hull ash a poor adsorbent when compared to commercial activated carbons with surface areas in the 600 to 1200 square meters per gram range (iodine numbers of 650 to 1000).

It would be highly desirable to provide activated carbon particles derived from caustic digestion by a caustic solution of rice hull ash from thermal pyrolysis of rice hulls substantially free of silicate residue from the caustic silicate solution thereby providing highly active, commercial grade activated carbon particles.

SUMMARY OF THE INVENTION

The present invention is directed to such highly activated carbon particles of such commercial grade activated carbon particles from rice hull ash containing them and methods of producing them.

The highly activated carbon particles of the present invention are derived from the caustic digestion by a caustic solution of rice hull ash from thermal pyrolysis of rice hulls in which the pores of the carbon particles are substantially free of any residual silicate from the caustic silicate solution.

The method of the present invention is a reactivation or regeneration process since rice hull ash carbon was initially thermally activated during thermal pyrolysis of rice hulls to produce rice hull ash and comprises removing substantially all of the silicate residue from the pores of such carbon particles thereby opening their pores and hence materially and substantially improving the activation of the carbon particles to commercial grade.

Preferably, the removal of silicate residue from the pores of the carbon particles is a two stage washing or rinsing process. First, the filtered damp carbon particles are washed with hot water at temperatures of 140° F. to 160° F. at a weight ratio of 3 parts hot water to 1 part damp carbon particles. Second, the filtered damp carbon particles are washed with a strong chemical reagent, such as an aqueous solution of phosphoric acid ($H_3PO_4$) at temperatures up to 250° C. or above. While other mineral acids such as sulfuric and hydrochloric can be used, phosphoric acid is preferred because it is a non-oxidizing acid, which acts as an acid catalyst for the production of a porous, crosslinked carbon structure. Also, $H_3PO_4$ seems to retain or fix more of the carbon in the structure than the thermal activation method which results in some thermal oxidation and loss of some carbon. A weight ratio of 2.5 parts acid solution to 1 part damp carbon particles is preferred. The acid concentration ranges from about 2 percent to 7 percent by weight. These steps dissolve and remove the silicate residue in the pores and return the carbon pores to a highly activated level.

While any mineral acid may be used, the currently referred one is phosphoric acid at a concentration of about 2 percent by weight.

The carbon is then dried by any conventional means, such as conventional forced convection or infrared heaters at temperatures in the range of 250° F. to 350° F.

Activated carbon particles derived from rice hull ash treated by this process have iodine numbers in the range of 650 to 1000, indicative of highly adsorbent, commercial grade carbons.

Accordingly, it is an object of the present invention to provide activated carbon particles of commercial grade and their method of production from caustic digestion of rice hull ash produced by thermal pyrolysis of rice hulls.

DESCRIPTION OF PRESENTLY PREFERRED EMBODIMENTS

The present invention is directed to a process for producing and activated carbon particles of commercial grade which utilizes a caustic silicate solution produced by the caustic digestion of rice hull ash obtained by thermal pyrolysis of rice hulls. Activated carbon is generated during this process which passes through the caustic digestion as an inert material and which has particle sizes of 100 percent passing a U.S. Standard 500 (25 microns) sieve with the average size of about 12 microns diameter. The carbon particles are removed by conventional filtration or separation equipment readily available on the market, and no description thereof is deemed necessary or given. The separated activated carbon has silicate residue from the caustic silicate solution in its pores thereby restricting them and thus their ability to adsorb, having an iodine number of about 225 to 300 because of the restricted pores.

As previously mentioned, preferably, the removal of he silicate from the pores of the carbon particles is a two stage washing or rinsing process. First, the filtered damp carbon particles are washed with hot water at temperatures of 140° F. to 160° F. and a weight ratio of 3 parts hot water to 1 part damp carbon particles. Second, the filtered damp carbon solids are washed with an aqueous solution of mineral acid such as phosphoric, sulfuric, or hydrochloric at a weight ratio of 2.5 parts dilute acid to 1 part damp carbon solids. The acid concentration ranges from about 2 percent to 7 percent by weight. These steps dissolve the silicate and return the carbon pores to a highly activated level.

While any mineral acid may be used, the preferred is phosphoric acid at a concentration of 2 percent by weight.

The carbon is then dried by any conventional means, such as conventional forced convection or infrared heaters at temperatures in the range of 250° F. to 350° F.

Activated carbons derived from rice hull ash, treated by this process, have iodine numbers in the range of 650 to 1000, indicative of highly adsorbent carbons.

EXAMPLE 1

In this example, rice hull ash of 70 percent silica and 30 percent carbon having a low crystalline silica content of less than 1 percent was obtained from Producers Rice Mill in Stuttgart, Ark. A caustic silicate solution was obtained from the amorphous rice hull ash by caustic digestion of the rice hull ash with a sodium hydroxide solution (caustic soda) of 50 percent NaOH in aqueous solution. Wet carbon particles were filtered from the sodium silicate solution and the filtered, wet carbon particles (50/50 solids/water) contained about 5.0 weight percent sodium silicate in their pores restricting them. The filtered carbon particles having silicate residue in their pores were washed with hot water at temperatures of 140° F. to 160° F. at a weight ratio of 3 parts hot water to 1 part damp carbon particles. Then, the filtered washed carbon particles were washed with a dilute 2 percent by weight aqueous solution of phosphoric acid, although equally good results were obtained in concentrations up to 7 percent by weight. This dissolved the silica residue in the pores of the carbon particles and returned them to a highly activated level, iodine number of 650 to 1000.

EXAMPLE 2

This example is the same as Example 1 except that an aqueous solution of sulfuric acid, and an aqueous solution of hydrochloric acid were used separately in concentrations of 2 percent to 5 percent by weight. The silicate residue in the pores of the carbon particles were dissolved and removed as in Example 1 resulting in highly activated carbon particles (iodine number 650 to 1000).

EXAMPLE 3

This example is the same of Examples 1 and 2 except that the carbon particles in the rice hull ash ranged from about 3 percent to 40 percent by weight. Again, the silicate residue in the carbon particle pores was dissolved and removed returning them to a highly activated state, that is an iodine number of 650 to 1,000.

Accordingly, the present invention is well suited and adapted to attain the ends and carry out the objective set forth and has the advantages and features mentioned as well as others inherent therein.

While presently preferred examples of the embodiments of the invention have been given for the purposes of disclosure, changes can be made therein which are within the spirit of the invention as defined by the scope of the appended claims.

What is claimed is:

1. In a method for producing activated carbon particles which are separated, by filtration, from a caustic silicate solution produced from caustic digestion of rice hull ash, the ash being obtained from thermal pyrolysis of rice hulls and contains activated carbon particles and pores which contain a silicate residue, the improvement comprising, (a) washing the filtered activated carbon particles with hot water at temperatures of about 140° F. to about 160° F., (b) washing the resulting damp activated carbon particles from step (a) with an aqueous mineral acid solution effective to dissolve and remove the silicate residue from the pores of the activated carbon particles, and (c) drying the activated carbon particles from step (b).

2. The method of claim 1 where, the aqueous mineral acid solution is selected from the group consisting of an aqueous solution of phosphoric, sulfuric, and hydrochloric acid at concentrations of about 2 percent to about 7 percent by weight mineral acid.

3. The method of claim 1 where, the dried activated carbon particles of step (c) have iodine numbers at least of 650.

4. The method of claim 3 where, the dried activated carbon particles of step (c) have iodine numbers from 650 to 1000.

5. Activated carbon particles having an iodine number of at least 650 and a particle size of not more than 25 microns derived from a caustic digestion of rice hull ash, the ash being obtained by thermal pyrolysis of rice hulls.

6. The activated carbon particles of claim 5 where,
the activated carbon particles have an iodine number from 650 to 1000.

7. Activated carbon particles having an iodine number of at least 650 and a particle size of not more than 25 microns derived from a caustic digestion of rice hull ash, the ash being obtained from thermal pyrolysis of rice hulls, said activated carbon particles contain pores which are free of silicate residue.

8. The method of claim 4 where,
the dried activated particles are of a particle size of not more than 25 microns.

9. The method of claim 4 where,
the dried activated particles are of a particle size of not more than 25 microns and of an average size of about 12 microns.

10. The activated carbon particles of claim 7 where,
the average particle size of the activated particles is about 12 microns.

* * * * *